(12) United States Patent
Hou

(10) Patent No.: US 10,627,996 B2
(45) Date of Patent: Apr. 21, 2020

(54) METHOD AND APPARATUS FOR SORTING FILTER OPTIONS

(71) Applicant: BEIJING XIAOMI MOBILE SOFTWARE CO., LTD., Beijing (CN)

(72) Inventor: Wendi Hou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/961,921

(22) Filed: Apr. 25, 2018

(65) Prior Publication Data

US 2018/0314394 A1  Nov. 1, 2018

(30) Foreign Application Priority Data

Apr. 28, 2017  (CN) .......................... 2017 1 0292194

(51) Int. Cl.
| | |
|---|---|
| *G06F 3/048* | (2013.01) |
| *G06F 3/0482* | (2013.01) |
| *H04N 5/232* | (2006.01) |
| *G06F 3/0484* | (2013.01) |

(52) U.S. Cl.
CPC .......... *G06F 3/0482* (2013.01); *G06F 3/0484* (2013.01); *H04N 5/23216* (2013.01); *H04N 5/23229* (2013.01); *H04N 5/23245* (2013.01)

(58) Field of Classification Search
CPC ................. G06F 3/0482; G06F 3/0484; G06F 16/24578; H04N 5/23245; H04N 5/23216; H04N 5/23229
See application file for complete search history.

(56) References Cited

U.S. PATENT DOCUMENTS

| | | | |
|---|---|---|---|
| 7,203,681 B1* | 4/2007 | Arnold | ............. G06F 21/562 |
| 2002/0030754 A1 | 3/2002 | Sugimoto | |
| 2004/0036779 A1 | 2/2004 | Cazier et al. | |
| 2004/0135889 A1 | 7/2004 | Koizumi et al. | |
| 2005/0206746 A1 | 9/2005 | Cazier et al. | |
| 2008/0143853 A1 | 6/2008 | Koizumi et al. | |
| 2008/0151069 A1 | 6/2008 | Koizumi et al. | |
| 2008/0170134 A1 | 7/2008 | Koizumi et al. | |
| 2009/0158167 A1* | 6/2009 | Wang | ............. G06F 3/0482 715/745 |

(Continued)

FOREIGN PATENT DOCUMENTS

| | | |
|---|---|---|
| CN | 102082874 A | 6/2011 |
| CN | 103838457 A | 6/2014 |

(Continued)

OTHER PUBLICATIONS

Extended European Search Report dated Jul. 30, 2018 in European Patent Application No. 18168023.2, 11 pages.

(Continued)

*Primary Examiner* — Matthew Ell
(74) *Attorney, Agent, or Firm* — Oblon, McClelland, Maier & Neustadt, L.L.P.

(57) ABSTRACT

The disclosure relates to a method and an apparatus for sorting filter options. The method includes determining a usage count of each of the plurality of filter options that are preset in the user terminal; and adjusting a sorting of each of the plurality of filter options in a list of filter options according to the usage count of each of the plurality of filter options.

16 Claims, 12 Drawing Sheets

Determine the usage count of each filter option preset in the user terminal in each shooting scene — S51

Determine a scene of a current image to be taken by the user — S52

Adjust a current list of filter options to be a list of filter options applicable to the scene of the current image to be taken by the user, based on the usage count of each filter option preset in the user terminal in each shooting scene — S53

(56) References Cited

U.S. PATENT DOCUMENTS

| | | |
|---|---|---|
| 2012/0038669 A1 | 2/2012 | Lee et al. |
| 2013/0239054 A1* | 9/2013 | Toshima ............... G01N 30/88 |
| | | 715/811 |
| 2015/0253970 A1 | 9/2015 | Cheng et al. |
| 2016/0360087 A1 | 12/2016 | Kwon et al. |
| 2018/0160026 A1 | 6/2018 | Kwon et al. |
| 2019/0098213 A1* | 3/2019 | Kim ..................... G06F 3/0487 |

FOREIGN PATENT DOCUMENTS

| | | |
|---|---|---|
| CN | 105279161 A | 1/2016 |
| CN | 106231173 A | 12/2016 |
| EP | 2 418 563 A2 | 2/2012 |
| EP | 2 418 563 A3 | 2/2012 |
| EP | 3 101 889 A2 | 12/2016 |
| EP | 3 101 889 A3 | 12/2016 |
| EP | 3101889 A2 * | 12/2016 ......... H04N 5/23229 |

OTHER PUBLICATIONS

Limbasiya, R., "Which is the best camera app Android 2016?", Retrieved from the Internet: URL: https://www.quora.com/Which-is-the-best-camera-app-Android-2016, Nov. 30. 2016, XP055494191, 2 pages.

King Jr., B., "[Lollipop Feature Spotlight] Multi-User Support Arrives on Phones", Retrieved from the Internet: URL: https://www.androidpolice.com/2014/10/18/lollipop-feature-spotlight-multi-user-support-arrives-phones/ , Oct. 18, 2014, XP055494130, 5 pages.

Combined Chinese Office Action and Search Report dated Mar. 5, 2019 in Patent Application No. 201710292194.0 (with English Translation of Category of Cited Documents), 7 pages.

\* cited by examiner

METHOD AND APPARATUS FOR SORTING FILTER OPTIONS

CROSS REFERENCE TO RELATED APPLICATIONS

This application is based on and claims priority to Chinese Patent Application No. 201710292194.0, filed on Apr. 28, 2017, the entire contents of which are incorporated herein by reference.

TECHNICAL FIELD

The present disclosure relates to the field of information processing, and more particularly, to a method and an apparatus for sorting filter options.

BACKGROUND

In daily life, more and more people like to take pictures or videos using a filter mode, or use the filter mode to beautify the pictures or videos they have taken. At present, filter options in a user terminal, such as a cell phone, a tablet computer, etc., are generally arranged in an order of factory settings. For example, when the filter mode of a beauty camera is used for shooting, the filter options in the beauty camera are arranged in a fixed order, and the order of the filter options to be viewed by anybody is the same. In this case, when a user's favorite filter option is located at a relatively backward position in the list of filter options, the user may need to slide the list multiple times to find a favorite filter mode each time the user wants to use the favorite filter mode. The operation process is not convenient enough.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for sorting a plurality of filter options in a user terminal. The method includes determining a usage count of each of the plurality of filter options that are preset in the user terminal; and adjusting a sorting of each of the plurality of filter options in a list of filter options according to the usage count of each of the plurality of filter options.

According to an aspect, when determining the usage count of each of the plurality of filter options, the method includes determining the usage count of each of the plurality of filter options based on a plurality of filtered images stored in the user terminal.

According to another aspect, when determining the usage count of each of the plurality of filter options based on the plurality of filtered images, the method includes identifying the plurality of filtered images from all images stored in the user terminal based on information about the storage of all the images stored in the user terminal; identifying a set of filtered images associated with a same application based on a storage path of each of the plurality of filter images; and determining the usage count of each of the plurality of filter options based on the set of filtered images associated with the same application.

According to yet another aspect, when determining the usage count of each of the plurality of filter options based on the plurality of filtered images, the method includes identifying a set of filtered images associated with a same user account of a same application based on the plurality of filtered images stored in the user terminal; and determining the usage count of each of the plurality of filter options based on the set of filtered images associated with the same user account of the same application.

According to yet another aspect, when determining the usage count of each of the plurality of filter options based on the plurality of filtered images, the method includes determining a filter option corresponding to each of the plurality of filtered images by comparing the plurality of filter images with filter parameters of each of the plurality of filter options; and calculating the usage count of each of the plurality of filter options based on the filter option corresponding to each of the plurality of filtered images.

According to yet another aspect, when determining the usage count of each of the plurality of filter options, the method includes determining the usage count of each of the plurality of filter options based on a stored usage record of a user using each of the plurality of filter options.

According to yet another aspect, when determining the usage count of each of the plurality of filter options, the method includes determining the usage count of each of the plurality of filter options within a predefined time period.

According to yet another aspect, when determining the usage count of each of the plurality of filter options the method includes determining the usage count of each of the plurality of filter options in each of a plurality of shooting scenes.

According to yet another aspect, when adjusting the sorting of each of the plurality of filter options, the method includes determining a scene of a current image to be taken by the user; and adjusting a current list of filter options to be a list of filter options applicable to the scene of the current image to be taken by the user based on the usage count of each of the plurality of filter options in each of the plurality of shooting scenes.

Aspects of the disclosure also provide a device for sorting a plurality of filter options in a user terminal. The device includes a processor and a memory for storing instructions executable by the processor. The processor is configured to determine a usage count of each of the plurality of filter options preset in the user terminal; and adjust a sorting of each of the plurality of filter options in a list of filter options according to the usage count of each of the plurality of filter options.

Aspects of the disclosure also provide a non-transitory computer-readable medium storing instructions that, when executed by one or more processors of a user terminal, cause the user terminal to determine a usage count of each of a plurality of filter options preset in the user terminal; and adjust a sorting of each of the plurality of filter options in a list of filter options according to the usage count of each of the plurality of filter options.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which same numbers in different drawings represent same or similar elements unless otherwise described. The implementations set forth in the following description of exemplary aspects do not represent all implementations consistent with the disclosure. Instead, they are merely examples of devices and methods consistent with aspects related to the disclosure as recited in the appended claims.

Figure 1:
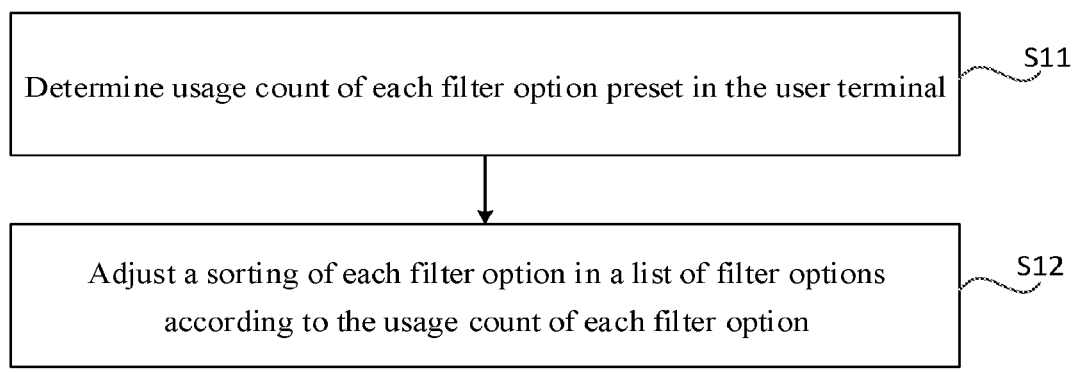
FIG. 1 is a flow chart illustrating a method for sorting filter options according to an exemplary aspect of the present disclosure.

Referring to FIG. 1, a flow chart of a method for sorting filter options according to an exemplary aspect is illustrated. As shown in FIG. 1, the method may be applied to a user terminal and include the following steps.

In step S11, it may be determined how many times each filter option preset in the user terminal is used by a user. In other words, a usage count of each filter option may be determined.

In step S12, a sorting of each filter option in a list of filter options may be adjusted, according to the usage count of each filter option.

The method for sorting filter options provided in the aspect of the present disclosure may be applied to a user terminal such as a cell phone, a tablet computer, etc. The user terminal may have an operation system integrated with a camera, or the user terminal may have an application with a shooting function installed thereon. The camera or the application may be preconfigured with a variety of filter options, such as Monochrome, Hue, Black & White, Fade, Bright Yellow, Print, Years, Nostalgic, etc. The list of filter options is a list including a number of filter options to be presented for the user to select.

In the present aspect, the sorting of each filter option preset in the user terminal in the list of filter options may be adjusted according to the usage count of each filter option. Specifically, a filter option with a larger usage count may be placed at the top of the list of filter options, and a filter option with a smaller usage count may be placed at the bottom of the list of filter options. The user can quickly select a desired filter option, as filter options with larger usage counts are placed at the top of the list. Compared to a list of filter options in a fixed order, the adjusted list of filter options may be more user-friendly and thus the user experience may be improved.

Alternatively, step S11 may have at least the following two implementations.

A first way to determine the usage count of each filter option: the usage count of each filter option preset in the user terminal may be determined based on a plurality of filtered images stored in the user terminal.

A second way to determine the usage count of each filter option: the usage count of each filter option preset in the user terminal may be determined based on a stored usage record of the user using each filter option preset in the user terminal.

In the present aspect, the usage count of each filter option preset in the user terminal may be determined based on a plurality of filtered images stored in the user terminal or a stored usage record of the user using each filter option preset in the user terminal.

Specifically, the first way to determine the usage count of each filter option may be applied in the case that the user terminal has filtered images stored therein. Here, the images may be pictures, such as dynamic pictures, static pictures or the like. Each filtered image may correspond to a certain filter option, so the filtered images stored in the user terminal may reflect the user's preference for the filter options. The filter options corresponding to the filtered images in the user terminal are the filter options that the user has used. The more times a certain filter option has been used, the more the user likes a filter mode selected via the filter option.

Thus, according to the plurality of filtered images stored in the user terminal, the filter options corresponding to these images may be determined, and then the usage counts of these filter options may be determined. Based on the usage counts of the filter options, an order of the user's preferences for the filter options may be obtained. Then, the sorting of the filter options in the list may be adjusted according to the user's preferences. If some filter options have not been used, then it may represent that the user does not like these filter options, and these filter options may be arranged after the used filter options by default.

With the method for sorting the filter options as provided in the present disclosure, the sorting of filter options may be performed depending on the preference of each user, thereby a suitable list of filter options may be presented to different users. Whenever the user wants to use a favorite filter option, the filter option may be quickly found by the user from the list of reordered filter options without the need of multiple times of sliding or other operations. Therefore, it may be more convenient to use the filter options.

The procedure of sorting the filter options as provided in the present disclosure may be performed in the background of the user terminal in real time as needed. Each time a new filtered image is detected to be stored in the user terminal, the usage counts of the filter options may be recalculated. If the order of the usage counts of the filter options has changed, then the sorting of the filter options in the list may be re-adjusted, so as to adjust the sorting of the filter options in real time according to the user's preference and thus provide the user with the most convenient use experience.

The second way to determine the usage count of each filter option may be applied in the case that the user uses a camera to take an image. Here, the camera may be a camera that comes with an operating system running on the user terminal, or a third party application that has a shooting function installed on the user terminal. When the user takes an image using the camera coming with the operating system or the third party application having the shooting function, the operating system or the third party application having the shooting function may record the usage of each filter option by the user. For example, the filter option selected by the user when taking an image may be Black & White, the filter option selected by the user when taking another image may be Nostalgic, and the like.

Based on the recorded usage of each filter option by the user, the usage count of each filter option can be calculated. For example, the user has taken totally three pictures, in which two pictures are taken by selecting the filter option Black & White and the remaining one picture is taken by selecting the filter option Nostalgic. As a result, it may be determined that the usage count of the filter option Black & White is 2 and the usage count of the filter option Nostalgic is 1.

Figure 2:
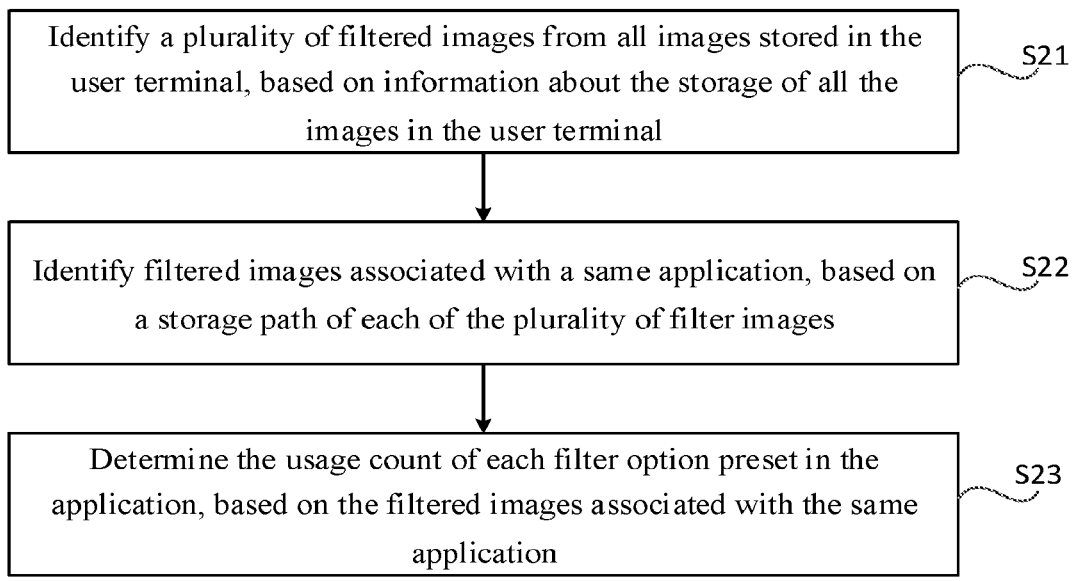
FIG. 2 is a flow chart illustrating a process for determining a usage count of a filter option, according to an exemplary aspect of the present disclosure.

Alternatively, FIG. 2 may be referred to illustrate an implementation that allows each application to correspond to a distinct sorting of filter options. FIG. 2 is a flow chart illustrating a process for determining a usage count of a filter option according to an exemplary aspect. As shown in FIG. 2, the process for determining the usage count of the filter option may include the following steps.

In step S21, a plurality of filtered images may be identified from all images stored in the user terminal, based on information about the storage of all the images in the user terminal.

In step S22, the filtered images associated with a same application may be identified based on the storage path of each of the plurality of filter images.

In step S23, the usage count of each filter option preset in the application may be determined based on the filtered images associated with the same application. In order to perform the method for sorting filter options of the present disclosure, it is required to firstly screen out the filtered images from all the images stored in the user terminal. It is possible to perform the screening based on the information about the storage of all the images stored in the user terminal.

A possible way is to perform the screening according to a file name of an image. Generally, an ordinary image and a filtered image may be stored in the user terminal with different file names. For example, the file name of the filtered image may include a special file name suffix, so that the filtered image can be identified from all the images stored in the user terminal.

As an example, the file name of the filtered image may be the name of an original image followed by "_ps" or the name of the original image followed by "_Camera". By screening the file names of the images, original images and corresponding filtered images may be identified from all the images stored in the user terminal.

After identifying the filtered images, step S22 and step S23 can be performed.

When a number of applications with a filter function are installed in the user terminal, the lists of filter options configured in the individual applications may be different from each other, and even the filter options having a same name may present different filter effects in different applications. Accordingly, with respect to different applications, the orders of the user's preferences for the filter options may be different, and thus the resulting sortings of the filter options may be different, too.

For example, two applications A and B having the filter function are installed. In the application A, the user may use the filter option Black & White more than the filter option Japanese; in the application B, both the filter option Black & White and the filter option Japanese are also provided for selection, but possibly because the filter effects of the two applications are different, the user may use the filter option Japanese more than the filter option Black & White when using the application B. In this case, a possibly reasonable sorting of the filter options may be that the filter option Black & White is placed before the filter option Japanese in the list of filter options of the application A, while the filter option Japanese is placed before the filter option Black & White in the list of filter options of the application B.

In the user terminal, the files obtained from a same application may usually be stored in a same file folder. Thus, based on storage paths of filtered images, the filtered images associated with the same application (e.g. Beauty Camera) can be identified. Then the usage count of each filter option can be determined by comparing filter parameters of these images to filter parameters of each filter option preset in the application. The order of each filter option in the list of filter options can be adjusted based on the usage count of each filter option. The finally obtained sorting of the filter options may be associated with the application, and thus the finally obtained sorting of the filter options may be bound to the application.

With the above method, it can be achieved that different applications correspond to different sortings of filter options to meet different preferences of the user for filter options in different applications. Thus, the convenience for the user to use the filter mode can be enhanced to a greater extent.

Figure 3:
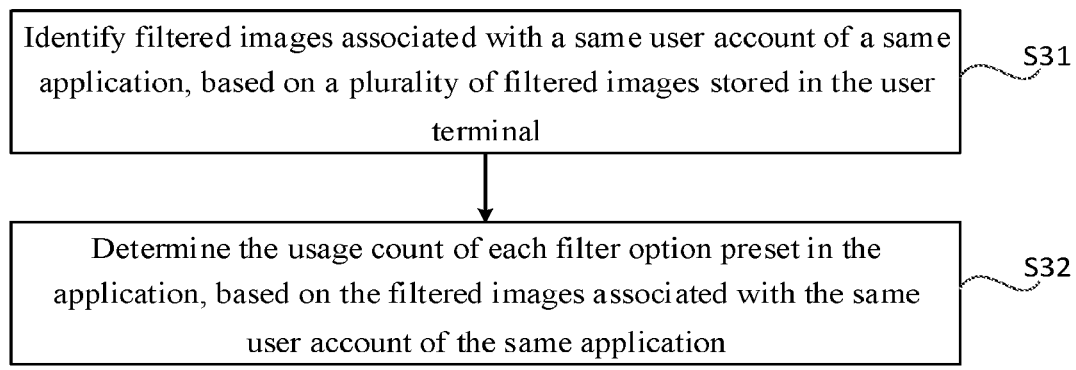
FIG. 3 is another flow chart illustrating a process for determining a usage count of a filter option, according to an exemplary aspect of the present disclosure.

Alternatively, FIG. 3 may be referred to illustrate another flow chart illustrating a process for determining a usage count of a filter option according to an exemplary aspect. As shown in FIG. 3, the process for determining the usage count of the filter option may include the following steps.

In step S31, filtered images associated with a same user account of a same application may be identified based on a plurality of filtered images stored in the user terminal.

In step S32, the usage count of each filter option preset in the application may be determined based on the filtered images associated with the same user account of the same application.

The user terminal may be used by different users. Accordingly, in the user terminal, the same application may include a number of user accounts. The preferences of different users for the filter options in the same application may be different. Thus, in the same application, different sortings of filter options should be provided for different users.

For example, suppose both a user A and a user B may use an application D having a filter function in a user terminal C, wherein the user A may log into the application D using a user account a and the user B may log into the application D using a user account b. When the user A is using the application D, the usage count of the filter option Black & White is larger than the usage count of the filter option Japanese; while when the user B is using the application D, the usage count of the filter option Japanese is larger than the usage count of the filter option Black & White. In this case, a possibly reasonable sorting of the filter options may be that the filter option Black & White is placed before the filter option Japanese in the list of filter options if the user A logs into the application D using the user account a; while the filter option Japanese is placed before the filter option Black & White in the list of filter options if the user B logs into the application D using the user account b.

In order to allow different user accounts to correspond to different sortings of filter options in the same application, the above process for determining the usage count of the filter option may be performed. Firstly, the filtered images associated with the same user account of the same application may be identified from the plurality of filtered images stored in the user terminal. Then the usage count of each filter option can be determined by comparing filter parameters of these images to filter parameters of each filter option preset in the application. The order of each filter option in the list of filter options can be adjusted based on the usage count of each filter option. The finally obtained sorting of the filter options may be associated with a certain user account of the application, and thus the finally obtained sorting of the filter options may be bound to the user account.

With the above method, it can be achieved that different user accounts in the same application correspond to different sortings of filter options. The sorting of the filter options always meets the preferences of the currently logged-in user for the filter options. Thus, the filter mode may become more user-friendly.

Figure 4:
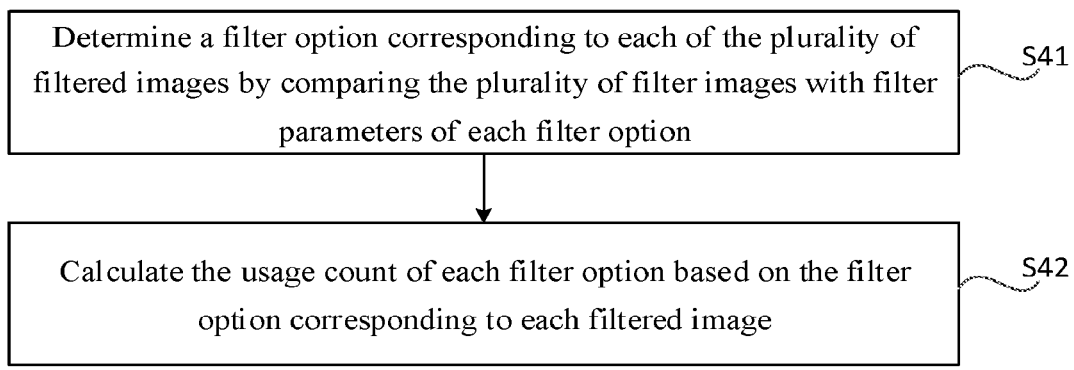
FIG. 4 is another flow chart illustrating a process for determining a usage count of a filter option, according to an exemplary aspect of the present disclosure.

Alternatively, FIG. 4 may be referred to illustrate another flow chart illustrating a process for determining a usage count of a filter option according to an exemplary aspect. As shown in FIG. 4, the process for determining the usage count of the filter option may include the following steps.

In step S41, a filter option corresponding to each of a plurality of filtered images may be determined by comparing the plurality of filter images with filter parameters of the filter option.

In step S42, the usage count of each filter option may be calculated based on the filter option corresponding to each filtered image.

Each filter option may have distinct filter parameters, and a resulting image processed using a certain filter option may have filter parameters the same as those of the filter option. Thus, the filter option corresponding to each filtered image may be determined by comparing the filter images with the filter parameters of each filter option.

A possible way is to determine the filter option corresponding to each filtered image based on a color cast parameter of the filter mode. The filter option may usually be represented by color changes, such as Black & White, Old, Japanese or other filter modes. Each filter mode may have a different color cast parameter. The color cast parameter may include a color cast mode and a color cast factor. Here, the color cast mode indicates a primary color of the filter option, and the color cast factor indicates the degree of color cast. The greater the degree of color cast is, the larger the color cast factor is. The color cast factor may be determined using the following method.

An image may be converted from a RGB space to a LAB space, and then the distribution of an AB component of the image may be analyzed. The two-dimensional distribution of the AB component of a filtered image is concentrated and unimodal; while the two-dimensional distribution of the AB component of an original image, which is not filtered, is scattered and multimodal.

Based on the distribution of the AB component of the image, it is possible to obtain a ratio of an average chromaticity D and a chromaticity center distance M of the image, i.e. the color cast factor K. The larger the color cast factor K is, the more severe the degree of color cast is.

The filtered images may also have a corresponding color cast characteristic, so the filter option corresponding to each filtered image may be determined by comparing the color cast parameters of the filter images with the color cast parameter of each filter option.

The usage count of each filter option may be calculated based on the filter option corresponding to each filtered image. Then the sorting of the filter options may be performed based on the usage count of each filter option.

Alternatively, the process for de determining the usage count of each filter option preset in the user terminal may include determining the usage count of each filter option preset in the user terminal within a predefined time period.

In order to make the adjusted sorting of filter options more accurate, a time period may be defined in advance. When determining the usage count of each filter option, only the usage of each filter option by the user within the time period may be considered, but the usage of each filter option by the user outside of the time period may be not taken into account. Here, the predefined time period may be defined by the user, or built in the user terminal. As an example, the time period may be the last three months, the last fifteen days, etc.

In the above aspect of determining the usage count of the filter option, for each filter option, not only whether the user has used the filter option is determined, but also the time when the user uses the filter option is identified. Then the time when the user uses the filter option may be compared to the predefined time period. If the time when the user uses the filter option falls into the predefined time period, the usage count of the filter option will increase by 1; otherwise, the usage count of the filter option will not change.

For example, the predefined time period is the last 15 days. The user has used the filter option Black & White at a time 12 days before today which is within the last 15 days, so the usage count of the filter option Black & White will increase by 1. As another example, the user has used the filter option Nostalgic at a time 17 days before today which is outside of the last 15 days, so the usage count of the filter option Nostalgic will not be affected and still keep unchanged.

Figure 5:
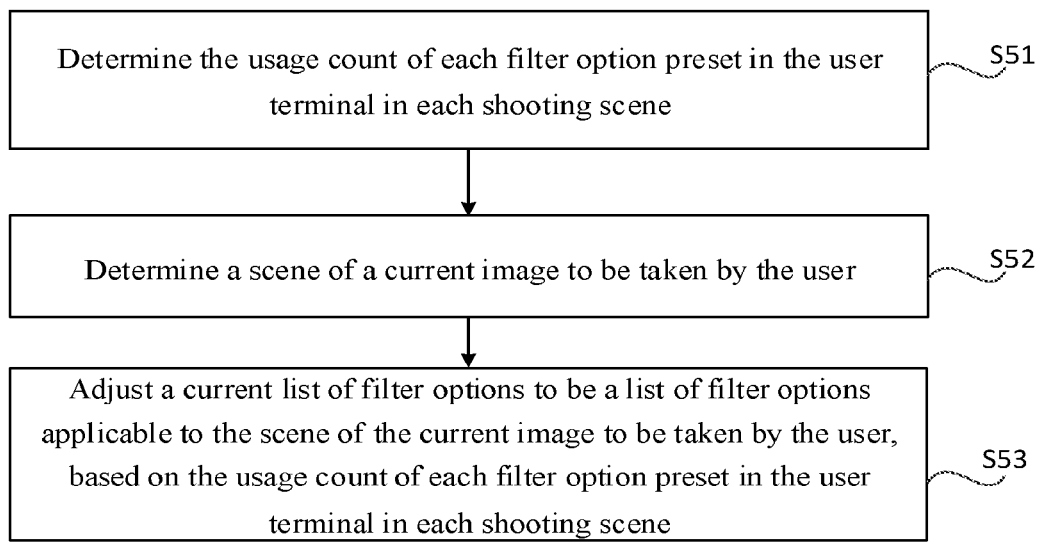
FIG. 5 is another flow chart illustrating a method for sorting filter options according to an exemplary aspect of the present disclosure.

Alternatively, FIG. 5 may be referred to illustrate another flow chart illustrating a method for sorting filter options according to an exemplary aspect. As shown in FIG. 5, the method may include the following steps.

In step S51, a usage count of each filter option preset in the user terminal in each shooting scene may be determined.

In step S52, a scene of a current image to be taken by the user may be determined.

In step S53, a current list of filter options may be adjusted to be a list of filter options applicable to the scene of the current image to be taken by the user, based on the usage count of each filter option preset in the user terminal in each shooting scene.

In order to make the adjusted sorting of filter options more accurate, different shooting scenes may be defined in advance. The shooting scenes may be determined depending on a photographed subject and whether a front camera is turned on. As an example, if the subject is a person and the front camera is turned on, then the shooting scene is Selfie; as another example, if the subject is a person other than the user and the rear camera is turned on, then the shooting scene is Portrait; as a further example, if the subject is an article and the rear camera is turned on, then the shooting scene is Article; if the subject is a landscape and the rear camera is turned on, then the shooting scene is Landscape; and so on. Here, the shooting scene may be defined by the user, or built in the user terminal.

In different shooting scenes, the user may prefer to use different filter options. In determining the usage count of each filter option, the usage count of each filter option in each shooting scene may be considered. The usage count of each filter option may be subdivided in accordance with the shooting scene, so as to get the usage count of each filter option for each shooting scene.

After calculating the usage count of each filter option for different shooting scenes, the shooting scene of the current image to be taken by the user may be determined by comparing the shooting scene of the current image to be taken by the user to each shooting scene, and then the current list of filter options may be adjusted to be the list of filter options applicable to the scene of the current image to be taken by the user.

Particularly, the shooting scene of the current image to be taken by the user may be identified based on whether the current image to be taken by the user is taken when the front camera is turned on or when the rear camera is turned on, or based on whether the current image to be taken by the user includes an article, a landscape, a portrait or the like. As an example, if the shooting scene of the current image to be taken by the user is identified to be Selfie, the current list of filter options may be adjusted to be the list of filter options applicable to the shooting scene Selfie.

Figure 6:
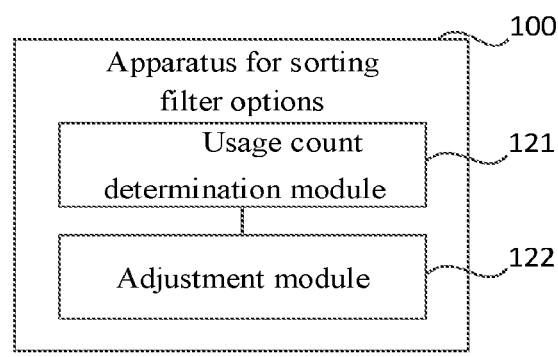
FIG. 6 is a block diagram illustrating an apparatus for sorting filter options according to an exemplary aspect of the present disclosure.

Based on the same inventive concept, a device for sorting filter options is also provided in the present disclosure. Refer to FIG. 6, which is a block diagram of a device for sorting filter options according to an exemplary aspect. As shown in FIG. 6, the device 100 includes a usage count determination module 121 and an adjustment module 122.

The usage count determination module 121 may be configured to determine a usage count of each filter option preset in a user terminal.

The adjustment module 122 may be configured to adjust a sorting of each filter option in a list of filter options according to the usage count of each filter option.

Figure 7:
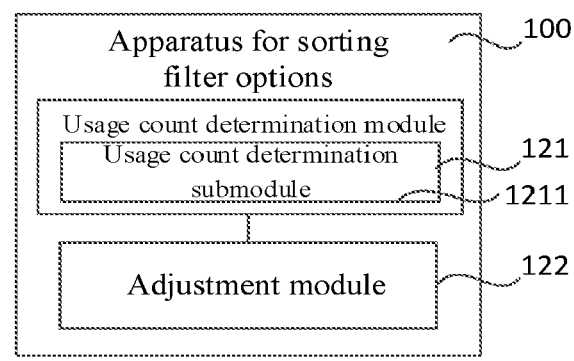
FIG. 7 is another block diagram illustrating an apparatus for sorting filter options according to an exemplary aspect of the present disclosure.

Alternatively, refer to FIG. 7, which is another block diagram of a device for sorting filter options according to an exemplary aspect. As shown in FIG. 7, the usage count determination module 121 of the device 100 may include a usage count determination submodule 1211 configured to determine the usage count of each filter option preset in the user terminal based on a plurality of filtered images stored in the user terminal.

Figure 8:
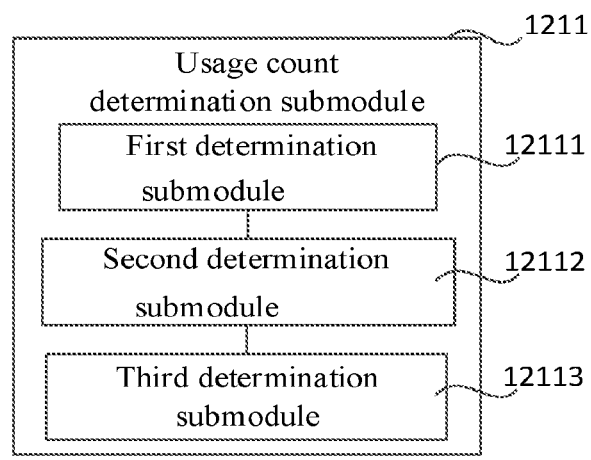
FIG. 8 is a block diagram illustrating a usage count determination submodule in the apparatus for sorting filter options, according to an exemplary aspect of the present disclosure.

Alternatively, refer to FIG. 8, which is a block diagram of a usage count determination submodule in a device for sorting filter options according to an exemplary aspect. As shown in FIG. 8, the usage count determination submodule 1211 may include the following submodules.

A first determination submodule 12111 may be configured to identify a plurality of filtered images from all images stored in the user terminal, based on information about the storage of all the images in the user terminal.

A second determination submodule 12112 may be configured to identify the filtered images associated with a same application, based on the storage path of each of the plurality of filter images.

A third determination submodule 12113 may be configured to determine the usage count of each filter option preset in the application, based on the filtered images associated with the same application.

Figure 9:
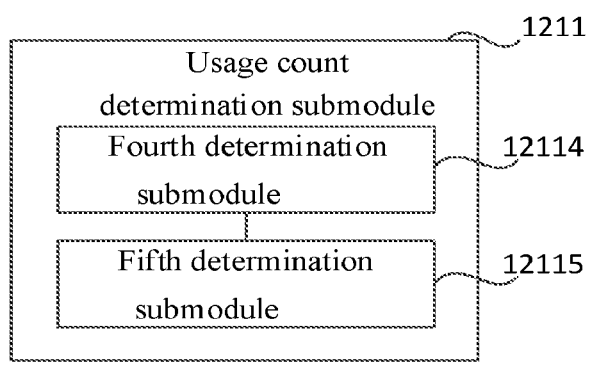
FIG. 9 is another block diagram illustrating a usage count determination submodule in the apparatus for sorting filter options, according to an exemplary aspect of the present disclosure.

Alternatively, refer to FIG. 9, which is another block diagram of a usage count determination submodule in a device for sorting filter options according to an exemplary aspect. As shown in FIG. 9, the usage count determination submodule 1211 may include the following submodules.

A fourth determination submodule 12114 may be configured to identify filtered images associated with a same user account of a same application, based on a plurality of filtered images stored in the user terminal.

A fifth determination submodule 12115 may be configured to determine the usage count of each filter option preset in the application, based on the filtered images associated with the same user account of the same application.

Figure 10:
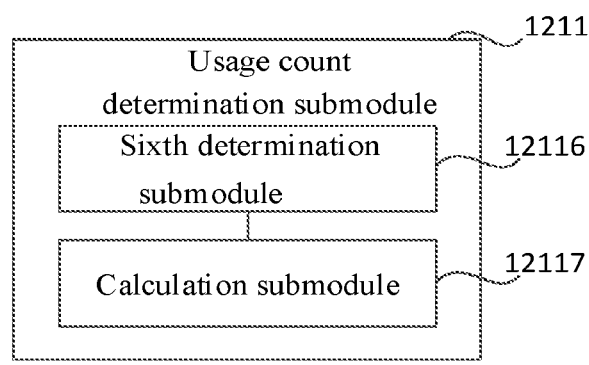
FIG. 10 is another block diagram illustrating a usage count determination submodule in the apparatus for sorting filter options, according to an exemplary aspect of the present disclosure.

Alternatively, refer to FIG. 10, which is another block diagram of a usage count determination submodule in a device for sorting filter options according to an exemplary aspect. As shown in FIG. 10, the usage count determination submodule 1211 may include the following submodules.

A sixth determination submodule 12116 may be configured to determine a filter option corresponding to each of a plurality of filtered images by comparing the plurality of filter images with filter parameters of each filter option.

A calculation submodule 12117 may be configured to calculate the usage count of each filter option based on the filter option corresponding to each filtered image.

Alternatively, the usage count determination module may include a seventh determination submodule configured to determine the usage count of each filter option preset in the user terminal based on a stored usage record of the user using each filter option preset in the user terminal.

Alternatively, the usage count determination module may include an eighth determination submodule configured to determine the usage count of each filter option preset in the user terminal within a predefined time period.

Alternatively, the usage count determination module may include a ninth determination submodule configured to determine the usage count of each filter option preset in the user terminal in each shooting scene.

Figure 11:
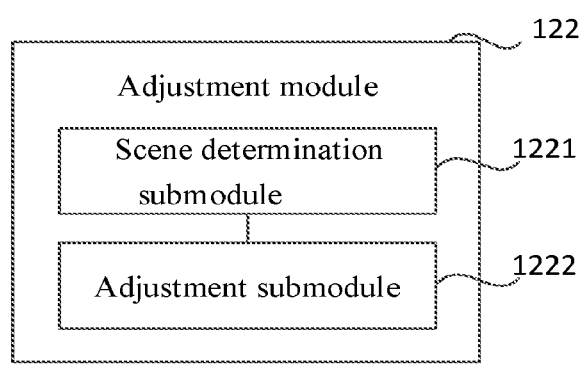
FIG. 11 is a block diagram illustrating an adjustment module in the apparatus for sorting filter options, according to an exemplary aspect of the present disclosure.

Alternatively, refer to FIG. 11, which is another block diagram of an adjustment module in a device for sorting filter options according to an exemplary aspect. As shown in FIG. 11, the adjustment module 122 may include a scene determination submodule 1221 configured to determine a scene of an image to be taken by the user; and an adjustment submodule 1222 configured to adjust a current list of filter options to be a list of filter options applicable to the scene of the current image to be taken by the user, based on the usage count of each filter option preset in the user terminal in each shooting scene.

With respect to the device of the above aspect, the specific mode in which each module operates has been described in detail in the aspect relating to the method, and the description thereof will not be set forth in detail herein.

Figure 12:
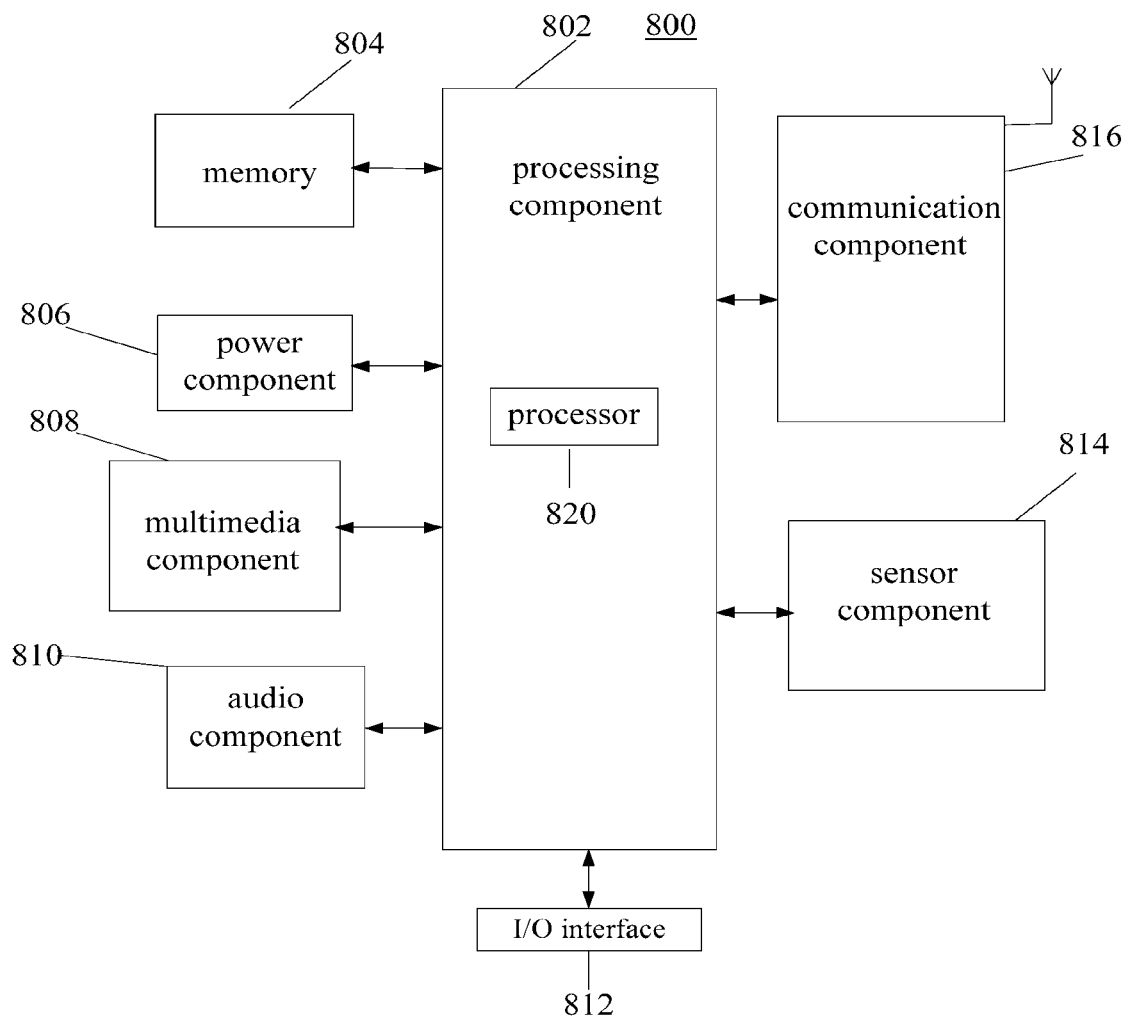
FIG. 12 is a block diagram illustrating an apparatus for sorting filter options according to an exemplary aspect of the present disclosure.

FIG. 12 is a block diagram illustrating an apparatus 800 for sorting filter options according to an exemplary aspect. For example, the apparatus 800 may be a mobile phone, a computer, a digital broadcasting terminal, a message transceiver, a game console, a tablet device, medical equipment, fitness equipment, a personal digital assistant or the like.

Referring to FIG. 12, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support operations of the apparatus 800. Examples of such data may include instructions for any applications or methods operated on the apparatus 800, contact data, phonebook data, messages, pictures, videos, etc. The memory 804 may be implemented using any type of volatile or nonvolatile storages, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some aspects, the multimedia component 808 includes a front camera and/or a rear camera. The front camera and/or the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some aspects, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a Complementary Metal Oxide Semiconductor (CMOS) or Charge-coupled Device (CCD) image sensor, for use in imaging applications. In some aspects, the sensor component 814 may also include an accelerometer sensor, a gyroscope sensor, a magnetic sensor, a distance sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In an exemplary aspect, the communication component 816 receives a broadcast signal or broadcast associated information from an external broadcast management system via a broadcast channel. In an exemplary aspect, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary aspects, the apparatus 800 may be implemented with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In exemplary aspects, there is also provided a non-transitory computer-readable storage medium including instructions, such as the memory 804 including instructions or computer programs executable by the processor 820 in the apparatus 800 to perform the above-described methods. For example, the non-transitory computer-readable storage medium may be a Ramdom Only Memory (ROM), a Random Access Memory (RAM), a Compact Disc Read-Only Memory (CD-ROM), a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following general principles thereof and including such departures from the present disclosure as come within known or customary practice in the art. The specification and aspects are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for sorting a plurality of filter options in a user terminal, comprising:
   determining a usage count of each of the plurality of filter options that are preset in the user terminal; and
   adjusting a sorting of each of the plurality of filter options in a list of filter options according to the usage count of each of the plurality of filter options,
   wherein determining the usage count of each of the plurality of filter options comprises:
      determining the usage count of each of the plurality of filter options in each of a plurality of shooting scenes, wherein the plurality of shooting scenes are determined depending on a photographed subject and whether a front camera of the user terminal is turned on, and wherein the front camera is located on a same side as a display screen of the user terminal to shoot an object facing the display screen, and
   wherein adjusting the sorting of each of the plurality of filter options comprises:
      determining a target shooting scene of a current image to be taken by the user from the plurality of shooting scenes; and
      adjusting a current list of filter options to be a list of filter options applicable to the target shooting scene of the current image to be taken by the user based on the usage count of each of the plurality of filter options in each of the plurality of shooting scenes.

2. The method of claim 1, wherein determining the usage count of each of the plurality of filter options comprises:
   determining the usage count of each of the plurality of filter options based on a plurality of filtered images stored in the user terminal.

3. The method of claim 2, wherein determining the usage count of each of the plurality of filter options based on the plurality of filtered images comprises:
   identifying the plurality of filtered images from all images stored in the user terminal based on information about the storage of all the images stored in the user terminal;
   identifying a set of filtered images associated with a same application based on a storage path of each of the plurality of filter images; and
   determining the usage count of each of the plurality of filter options based on the set of filtered images associated with the same application.

4. The method of claim 2, wherein determining the usage count of each of the plurality of filter options based on the plurality of filtered images comprises:
   identifying a set of filtered images associated with a same user account of a same application based on the plurality of filtered images stored in the user terminal; and
   determining the usage count of each of the plurality of filter options based on the set of filtered images associated with the same user account of the same application.

5. The method of claim 2, wherein determining the usage count of each of the plurality of filter options based on the plurality of filtered images comprises:
   determining a filter option corresponding to each of the plurality of filtered images by comparing the plurality of filter images with filter parameters of each of the plurality of filter options; and
   calculating the usage count of each of the plurality of filter options based on the filter option corresponding to each of the plurality of filtered images.

6. The method of claim 1, wherein determining the usage count of each of the plurality of filter options comprises:
   determining the usage count of each of the plurality of filter options based on a stored usage record of a user using each of the plurality of filter options.

7. The method of claim 1, wherein determining the usage count of each of the plurality of filter options comprises:
   determining the usage count of each of the plurality of filter options within a predefined time period.

8. A device for sorting a plurality of filter options in a user terminal, comprising:
   a processor;
   a memory for storing instructions executable by the processor,
   wherein the processor is configured to:
      determine a usage count of each of the plurality of filter options preset in the user terminal; and
      adjust a sorting of each of the plurality of filter options in a list of filter options according to the usage count of each of the plurality of filter options,
   wherein the processor is further configured to:
      determine the usage count of each of the plurality of filter options in each of a plurality of shooting scenes, wherein the plurality of shooting scenes are determined depending on a photographed subject and whether a front camera of the user terminal is turned on, and wherein the front camera is located on a same side as a display screen of the user terminal to shoot an object facing the display screen;
      determine a target shooting scene of a current image to be taken by the user from the plurality of shooting scenes; and
      adjust a current list of filter options to be a list of filter options applicable to the target shooting scene of the current image to be taken by the user based on the usage count of each of the plurality of filter options in each of the plurality of shooting scenes.

9. The device of claim 8, wherein the processor is further configured to:
   determine the usage count of each of the plurality of filter options based on a plurality of filtered images stored in the user terminal.

10. The device of claim 9, wherein the processor is further configured to:

identify the plurality of filtered images from all images stored in the user terminal, based on information about the storage of all the images stored in the user terminal;

identify a set of filtered images associated with a same application, based on a storage path of each of the plurality of filter images; and determine the usage count of each of the plurality of filter options based on the set of filtered images associated with the same application.

11. The device of claim 9, wherein the processor is further configured to:

identify a set of filtered images associated with a same user account of a same application based on the plurality of filtered images stored in the user terminal; and determine the usage count of each of the plurality of filter options based on the set of filtered images associated with the same user account of the same application.

12. The device of claim 9, wherein the processor is further configured to:

determine a filter option corresponding to each of the plurality of filtered images by comparing the plurality of filter images with filter parameters of each of the plurality of filter options; and calculate the usage count of each of the plurality of filter options based on the filter option corresponding to each of the plurality of filtered images.

13. The device of claim 8, wherein the processor is further configured to:

determine the usage count of each of the plurality of filter options based on a stored usage record of the user using each filter option preset in the user terminal.

14. The device of claim 8, wherein the processor is further configured to:

determine the usage count of each of the plurality of filter options within a predefined time period.

15. A non-transitory computer-readable medium storing instructions that, when executed by one or more processors of a user terminal, cause the user terminal to:

determine a usage count of each of a plurality of filter options preset in the user terminal; and adjust a sorting of each of the plurality of filter options in a list of filter options according to the usage count of each of the plurality of filter options, wherein the instructions further cause the user terminal to:

determine the usage count of each of the plurality of filter options in each of a plurality of shooting scenes, wherein the plurality of shooting scenes are determined depending on a photographed subject and whether a front camera of the user terminal is turned on, and wherein the front camera is located on a same side as a display screen of the user terminal to shoot an object facing the display screen;

determine a target shooting scene of a current image to be taken by the user from the plurality of shooting scenes; and adjust a current list of filter options to be a list of filter options applicable to the target shooting scene of the current image to be taken by the user based on the usage count of each of the plurality of filter options in each of the plurality of shooting scenes.

16. The computer readable storage medium of claim 15, wherein the instructions further cause the user terminal to:

determine the usage count of each of the plurality of filter options based on a plurality of filtered images stored in the user terminal.

* * * * *